United States Patent

Schalk

[11] Patent Number: 5,975,102
[45] Date of Patent: Nov. 2, 1999

[54] PROCESS AND APPARATUS FOR DETECTING THE LIMIT LEVEL OF LIQUIDS AND BULK MATERIALS

[75] Inventor: Adelbert Schalk, Wutoschingen-Horheim, Germany

[73] Assignee: Georg Fischer Rohrleitungssysteme AG, Schaffhausen, Switzerland

[21] Appl. No.: 08/689,844

[22] Filed: Aug. 14, 1996

[30] Foreign Application Priority Data

Sep. 11, 1995 [CH] Switzerland ............... 02 567/95

[51] Int. Cl.⁶ .............. F16K 31/02; H01L 41/08
[52] U.S. Cl. .............. 137/2; 73/290 V; 137/392; 310/332
[58] Field of Search ............. 73/290 V; 137/386, 137/392, 2; 310/320, 328, 330, 331, 332; 307/118; 361/178

[56] References Cited

U.S. PATENT DOCUMENTS

| | | | |
|---|---|---|---|
| 2,478,223 | 8/1949 | Argabrite | 310/333 |
| 3,625,058 | 12/1971 | Endress et al. | 73/290 V |
| 3,949,247 | 4/1976 | Fenner et al. | 310/332 |
| 4,112,279 | 9/1978 | Brohard | 310/332 |
| 4,325,416 | 4/1982 | Hermann | 73/290 V |
| 4,383,443 | 5/1983 | Langdon | 73/290 V |
| 4,553,061 | 11/1985 | Germano | 310/332 |
| 4,594,584 | 6/1986 | Pfeiffer et al. | 73/290 V |
| 4,785,663 | 11/1988 | Hermann | 73/290 V |
| 4,833,920 | 5/1989 | Knecht et al. | 73/717 |
| 4,884,090 | 11/1989 | Tanaka et al. | 310/332 |
| 4,896,535 | 1/1990 | Duckart et al. | 73/290 V |
| 4,896,536 | 1/1990 | Benz | 73/290 V |
| 5,068,567 | 11/1991 | Jones | 310/332 |
| 5,076,314 | 12/1991 | Ikehata et al. | 310/332 |
| 5,083,056 | 1/1992 | Kondou | 310/332 |
| 5,191,316 | 3/1993 | Dreyer | 73/290 V |
| 5,382,864 | 1/1995 | Morikawa et al. | 310/332 |
| 5,625,343 | 4/1997 | Rottmar | 73/290 V |
| 5,631,633 | 5/1997 | Dreyer et al. | 73/290 V |

FOREIGN PATENT DOCUMENTS

| | | | |
|---|---|---|---|
| 3044353 | 6/1982 | Germany | 73/290 V |
| 4-083733 | 3/1992 | Japan . | |
| 5-047393 | 12/1993 | Japan . | |

OTHER PUBLICATIONS

R. M. Langdon, Ph.D., "Vibratory Process Control Transducers", Marconi Review, vol. 43, No. 218, 3rd Quarter (1980), pp. 156–175.

*Primary Examiner*—George L. Walton
*Attorney, Agent, or Firm*—Bachman & Lapointe, P.C.

[57] ABSTRACT

In a process for the detection of the limit level of liquids and bulk materials in containers and pipelines, the change in the oscillation behavior of a sensor which is excited to oscillation is detected electronically and used to trigger a switch command. As sensor there is used a parallel bimorph piezoelectric element (22) having a common central electrode (44) and two outer electrodes (46, 48). A first alternating voltage (U1) with an oscillator frequency (f1) is applied between the central electrode (44) and a first outer electrode (46), a second alternating voltage is measured as amplitude of oscillation (U2) with corresponding oscillation frequency (f2) between the central electrode (44) and the second outer electrode (48), and the measured amplitude of oscillation (U2) or oscillation frequency (f2) is converted into an output switch signal.

In a device suitable for the carrying out of the process, the piezoelectric element (22) is inserted in liquid-tight manner into a plastic cover (24), the plastic cover (24) in its turn being fastened in liquid-tight manner to a plastic housing which passes through the wall (16) of a container or a pipeline, and the plastic cover (24) together with the piezoelectric element (22) extends into a protective tube (18) developed on the plastic housing (12).

6 Claims, 1 Drawing Sheet

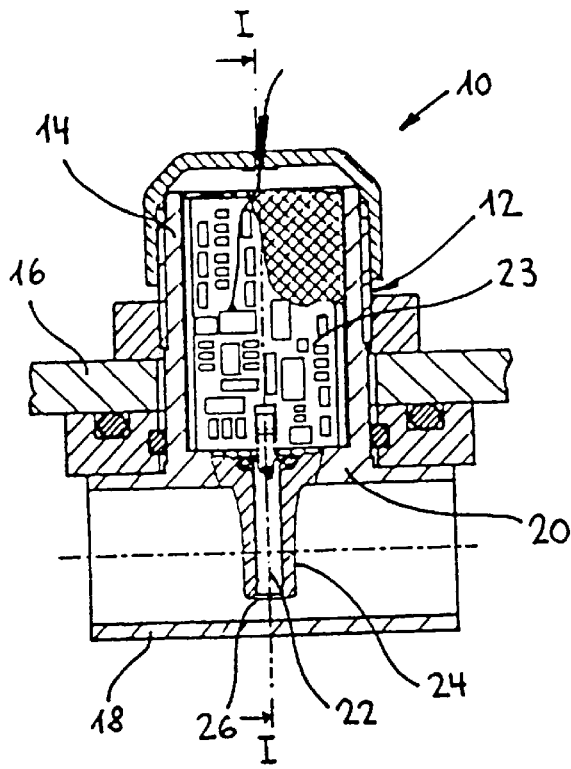
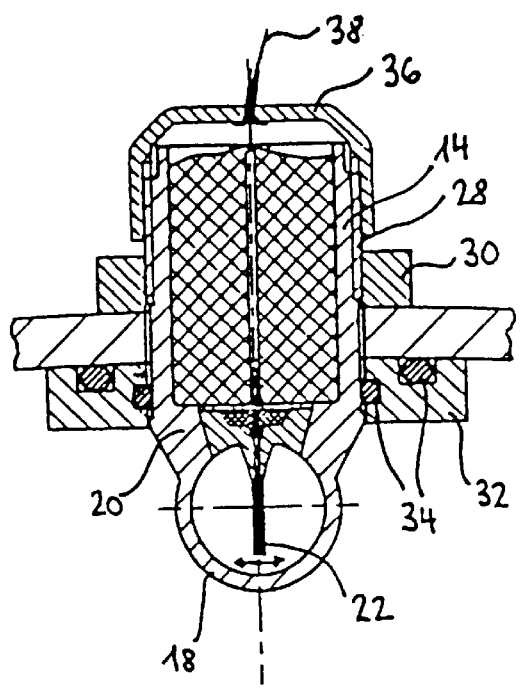
Fig.1
Fig.2
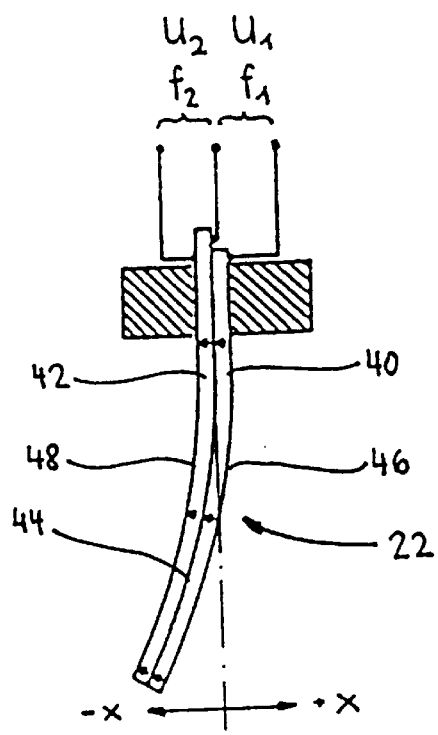
Fig.3

PROCESS AND APPARATUS FOR DETECTING THE LIMIT LEVEL OF LIQUIDS AND BULK MATERIALS

BACKGROUND OF THE INVENTION

The present invention relates to a process for detecting the limit level of liquids and bulk materials in containers and pipelines, in which the change of the oscillation behavior of a sensor which is excited to oscillation is detected electronically and used to trigger a switch command. The invention also relates to an apparatus suitable for the carrying out of the process.

Containers or tanks are used in practically all applications of pipeline systems. Frequently, when a minimum level therein is reached, a switch signal must be given off which, for instance, controls a pump for the filling of a container. If the upper level of filling is reached by the end of a given period of time, then the pump must be turned off by a second switch signal. It is also conceivable that a pump to convey a fluid out of a tank until a minimum level has been reached. The pump must then be turned off in order to avoid having it operate dry. In may industrial processes, it is also necessary to know whether a pipeline is full or empty. For example, in the case of centrifugal pumps running dry is generally to be avoided so that a pump should be turned on only when the pipe on the intake side is full.

For the detection of the limit level, so-called vibration limit switches are known, for instance from Federal Republic of Germany 42 03 967 C2. The vibratory part used as sensor consists of a vibratory fork, the vibration behavior of which changes as the sensor is covered by the material being introduced. This change in oscillation is detected by an integrated measurement electronic system and a switch command is given. Limit switches which are based on the oscillating-fork principle are strong, accurate, free of adjustment, and require little maintenance. Made of metal, they are, however, unsuitable, or scarcely suitable, for many fluids or for highly pure uses.

In view of this prior art, it is the principle object of the present invention to provide a method, as well as an apparatus, of the aforementioned type which, in addition to said advantages of the processes and apparatus based on the vibration principle, have a broader field of use with respect to liquids.

SUMMARY OF THE INVENTION

The foregoing object is achieved, in accordance with the present invention, wherein a process of the aforementioned type which includes a sensor of a parallel bimorph piezo cell having a common central electrode and two outer electrodes, comprises applying a first alternating voltage having an oscillator frequency between the central electrode and a first outer electrode, measuring a second alternating voltage as amplitude of oscillation with corresponding oscillation frequency between the central electrode and the second outer electrode, and the amplitude of oscillation or oscillation frequency measured is transformed into an output switch signal.

By the use in accordance with the invention of a parallel bimorph piezoelectric element there is obtained, in simple fashion, a combined sensor/actuator system of high switching accuracy. For optimal operation, the resonant frequency is selected as oscillator frequency.

In an apparatus suitable for the carrying out of the process of the invention, the piezoelectric element is inserted, in liquid-tight manner, in a plastic covering, t-he plastic covering, in a particularly preferred embodiment, in its turn being attached in liquid-tight manner to a plastic housing which passes through the wall of a container or of a pipeline.

Due to the 100% plastic development, the device of the invention is suitable for use in all liquids to which the plastic used is stable. Suitable plastics are, for instance, PE, PVC, PP, PVDF as well as other plastics used for containers and pipeline systems. The development which is 100% of plastic also has the advantage that dead spaces and undercuts can be avoided and the apparatus is thus also suitable for use in very pure fluids.

For protection against impermissibly high mechanical stresses, a protective tube can be provided which is formed on the plastic housing and into which the plastic covering together with the piezoelectric element extends.

An electronic unit which is dielectrically connected to the piezoelectric element is preferably arranged within the plastic housing.

BRIEF DESCRIPTION OF THE DRAWINGS

Other advantages, features and details of the invention will become evident from the following description of a preferred embodiment, read with reference to the drawing, in which;

FIG. 1 is a cross section through a measuring instrument for detecting the limit level;

FIG. 2 is a section through FIG. 1 along the line I—I; and

FIG. 3 is a parallel bimorph piezoelectric element.

DETAILED DESCRIPTION OF THE PREFERRED EMBODIMENT

A measuring instrument 10, shown in FIGS. 1 and 2, for detecting the limit level of liquids and bulk materials has a plastic housing 12 with a cylindrical part 14 as well as a tubular part 18 which is connected in one piece with it by a bottom part 20. The cylindrical part 14 is passed through a container wall 16 in such a manner that the tubular part 18 lies within a container, not shown in the drawing in order not to clutter it.

Into the interior of the tubular part 18 there extends, in fin shape, a parallel bimorph piezoelectric element 22 which is surrounded, in liquid-tight manner by a plastic cover 24. The plastic cover 24 engages into the bottom part 20 of the plastic housing 12 and is welded to it. The piezoelectric element 22 is electrically connected, via the open end of the plastic cover 24 which opens into the cylindrical part 14, to an electronic unit 23 which is arranged in the cylindrical part 14.

The measuring instrument 10 is fastened to the container wall 16 by means of a threaded ring 30 which is screwed on an external thread 28 on the cylindrical part 14 of the plastic housing 12. By tightening the threaded ring 30, a mating ring 32 which grips around the cylindrical part 14 is pressed on the inside of the container against the container wall 16 and thus holds the plastic housing 22 in force-locked manner. The sealing of the cylindrical part 14 with respect to the container wall 16 is effected by annular packings 34 arranged in the mating ring 32.

The cylindrical part 14 of the plastic housing 12, which part is open on the outside of the container, is closed by a cover hood 36 which is also screwed on the external thread 28. An electric connecting cable 38 which passes through the cover hood 36 serves, on the one hand, for the external feeding of current to the electronic unit and, on the other hand, for the forwarding of an output signal which serves, for instance, to trigger a switch process.

The manner of operation of the measurement instrument 10 for detecting the limit level is described in detail below with reference to FIG. 3.

The strip-shaped parallel bimorph piezoelectric element 22 consists of two strip elements 40, 42 which lie against each other and have a common central electrode 44. Each of the strip elements 40, 42 is provided on its outer side with a corresponding outer electrode 46, 48.

Between the central electrode 44 and the outer electrode 46 of the strip element 40, an alternating voltage U1 of oscillation frequency f1 is applied. As a result of this, the piezoelectric element 22, and thus also the plastic cover 24 surrounding it, is caused to oscillate. The direction of oscillation x is perpendicular to the flat sides of the piezoelectric element 22 and the maximum deflection of swing is present at the free end 26 of the plastic cover 24, i.e. at the tip of the fin. As oscillator frequency the resonant frequency is preferably selected. Between the central electrode 44 and the outer electrode 48 of the strip element 42, the oscillation amplitude U2 with the frequency f2 is measured and transformed by the electronic unit into an output switch signal by which, for instance, a relay can be switched in order to control a pump. The parallel bimorph piezoelectric element 22 is thus used simultaneously as actuator and as sensor.

The oscillation of the plastic cover or fin 22 excited by the alternating voltage U1 with the frequency f1 is damped to a greater or lesser extent by the surrounding fluid. Upon reaching a limit level, there is a change in the surrounding fluid from, for instance, air to a liquid or the reverse, and the sensor signal is changed accordingly.

For the evaluation of the sensor signal, both the change of the signal amplitude and a the shift of the resonant frequency can be employed. Influences of disturbing oscillations due to container vibrations and/or disturbing turbulences caused by agitators are negligible. The tubular part 18 of the plastic housing 12 serves as protective tube and sees to it that impermissibly high mechanical stresses are not applied to the fin or plastic cover 24.

In addition to the possibility of mounting shown in FIGS. 1 and 2, the instrument 10 can also be installed by welding it into a container wall or into a pipeline.

In another embodiment, the measuring instrument 10 can be simply screwed directly into the pipe wall.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a method for detecting and controlling the level of liquids and bulk materials in containers and pipelines wherein a change in the oscillation behavior of a sensor excited to oscillation is detected electronically and used to trigger a switch command, the improvement comprising the steps of: (a) providing a sensor comprising a parallel bimorph piezoelectric element having a common central electrode and two outer electrodes, (b) applying a first alternating voltage (U1) having an oscillator frequency (f1) between the central electrode and a first outer electrode, (c) measuring a second alternating voltage as amplitude of oscillation (U2) with corresponding oscillation frequency (f2) between the central electrode and the second outer electrode, and (d) transforming the measured amplitude of oscillating (U2) with oscillation frequency (f2) into an output switch signal for controlling the limit of the liquid and bulk materials.

2. A method according to claim 1, characterized by the fact that the resonant frequency is used as oscillator frequency (f1).

3. A device for detecting and controlling the limit of liquids and bulk materials in containers and pipelines comprises (a) a sensor means comprising a parallel bimorph piezoelectric element having a common central electrode and two outer electrodes on either side of said common central electrode, said piezoelectric element is mounted in a plastic cover in a liquid-tight manner, (b) means for applying a first alternating voltage (U1) having an oscillation frequency (f1) between the central electrode and a first outer electrode, (c) means for measuring a second alternating voltage as amplitude of oscillation (U2) with corresponding oscillation frequency (f2) between the central electrode and the second outer electrode, and (d) means for transforming the measured amplitude of oscillating (U2) with oscillation frequency (f2) into an output switch signal for controlling the limit of the liquid and bulk materials.

4. A device according to claim 3, wherein said plastic cover is fixed in a liquid-tight manner to a plastic housing adapted to be fitted onto the wall of said container and pipeline.

5. A device according to claim 4, wherein the piezoelectric element in said plastic cover extends into a protective tube which is formed on the plastic housing.

6. A device according to claim 5, wherein an electronic unit is electrically connected to said piezoelectric element and is arranged in said plastic housing.

* * * * *